(12) United States Patent
Liu

(10) Patent No.: US 12,264,714 B2
(45) Date of Patent: Apr. 1, 2025

(54) ADJUSTOR FOR A SECONDARY PUMP OF A BRAKE

(71) Applicant: Cosda Manufacturing Company, Taichung (TW)

(72) Inventor: Lai-Cheng Liu, Taichung (TW)

(73) Assignee: COSDA MANUFACTURING COMPANY, Taichung (TW)

( * ) Notice: Subject to any disclaimer, the term of this patent is extended or adjusted under 35 U.S.C. 154(b) by 316 days.

(21) Appl. No.: 18/070,053

(22) Filed: Nov. 28, 2022

(65) Prior Publication Data

US 2024/0175472 A1    May 30, 2024

(51) Int. Cl.
*F16D 65/00* (2006.01)
*F16D 121/04* (2012.01)

(52) U.S. Cl.
CPC ...... *F16D 65/0043* (2013.01); *F16D 2121/04* (2013.01)

(58) Field of Classification Search
CPC .................................................. F16D 65/0043
See application file for complete search history.

(56) References Cited

U.S. PATENT DOCUMENTS

| | | | |
|---|---|---|---|
| 7,194,948 B2 * | 3/2007 | Liu ..................... | F16D 65/0043 91/454 |
| 11,454,290 B2 * | 9/2022 | Chen ..................... | B60T 17/221 |
| 2006/0288861 A1 * | 12/2006 | Liu ........................ | F15B 15/202 91/418 |
| 2008/0083070 A1 * | 4/2008 | Huang ................ | B25B 27/0035 7/100 |
| 2010/0212924 A1 * | 8/2010 | Liu ..................... | F16D 65/0043 173/218 |

* cited by examiner

Primary Examiner — Jason L Vaughan
(74) Attorney, Agent, or Firm — Muncy, Geissler, Olds & Lowe, P.C.

(57) ABSTRACT

An adjustor for a secondary pump of a brake is provided, including: a main body, being integrally formed of one piece, including a cylinder and a handle connected to the cylinder, the cylinder having a chamber thereinside, the handle having a passage in communication with the chamber; a piston, movably received in the chamber; a blocking member, connected to the cylinder; and a rod, connected to the piston and extending through the cylinder.

8 Claims, 4 Drawing Sheets

ADJUSTOR FOR A SECONDARY PUMP OF A BRAKE

BACKGROUND OF THE INVENTION

Field of the Invention

The present invention relates to an adjustor for a secondary pump of a brake.

Description of the Prior Art

A car's braking system includes a brake pedal, a primary pump, four secondary pumps and four brakes. When the brake pedal is depressed, the primary pump is actuated to deliver pressurized fluid to the four secondary pumps, and the four secondary pumps push the four brakes to stop the wheels of the car. Each brake includes a brake hub or disc and two brake shoes for friction. When the brake shoes are too thin to work properly, they must be replaced. Before replacement of the brake shoes, the secondary pump must be pushed back to its original position by using an adjuster.

However, components of the conventional adjuster are each an independent component, so the conventional adjuster has numerous components and complex structure, is difficult and time-consuming to assemble, and is of high cost. Moreover, each component of the conventional adjuster is generally made of metal, so the overall weight is heavy, the cost is high, the processing and manufacturing are difficult, the production efficiency is poor, and it is not conducive to mass production.

The present invention is, therefore, arisen to obviate or at least mitigate the above-mentioned disadvantages.

SUMMARY OF THE INVENTION

The main object of the present invention is to provide an adjustor for a secondary pump of a brake which provides good sealing, has a simple structure, is easy to manufacture, assemble/disassemble and/or replace, and is of low production cost.

To achieve the above and other objects, an adjustor for a secondary pump of a brake is provided, including: a main body, being integrally formed of one piece, including a cylinder and a handle connected to the cylinder, the cylinder having a chamber thereinside, the handle having a passage in communication with the chamber; a piston, movably received in the chamber; a blocking member, connected to the cylinder; and a rod, connected to the piston and extending through the cylinder.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
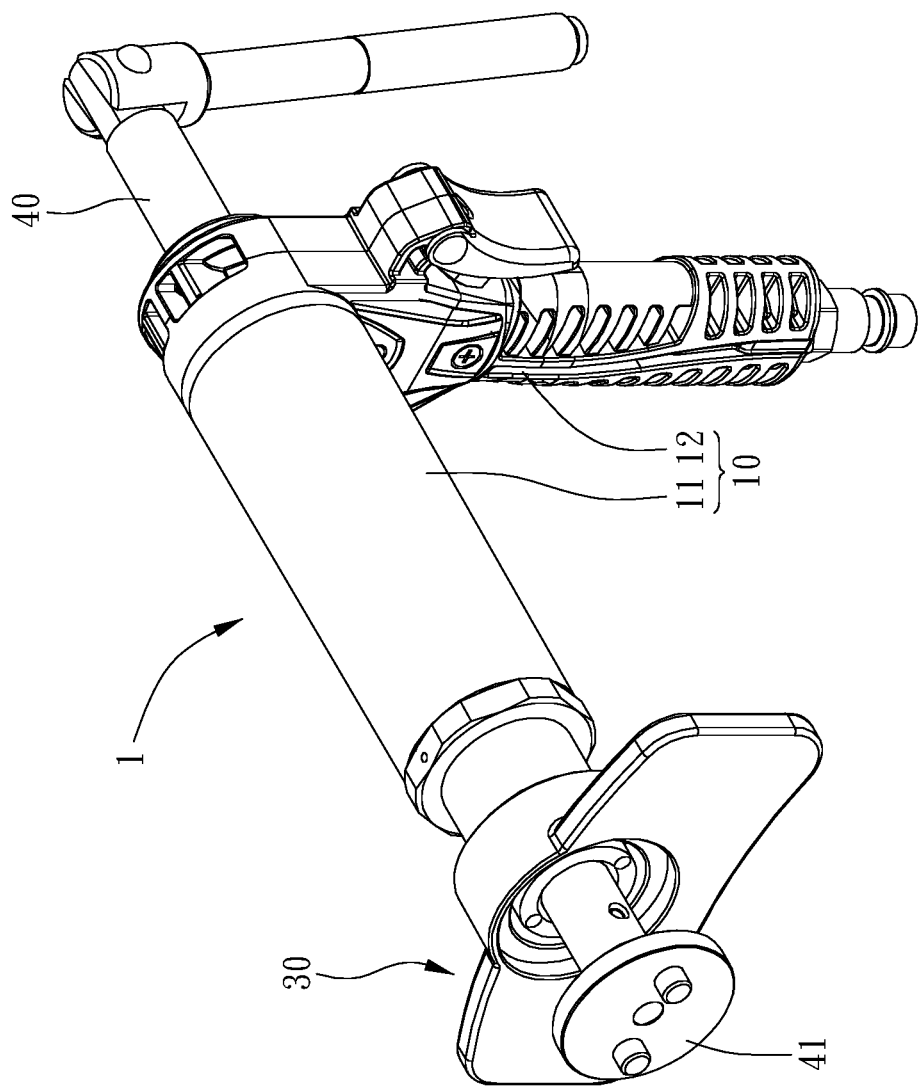
FIG. 1 is a stereogram of a preferable embodiment of the present invention.
Figure 2:
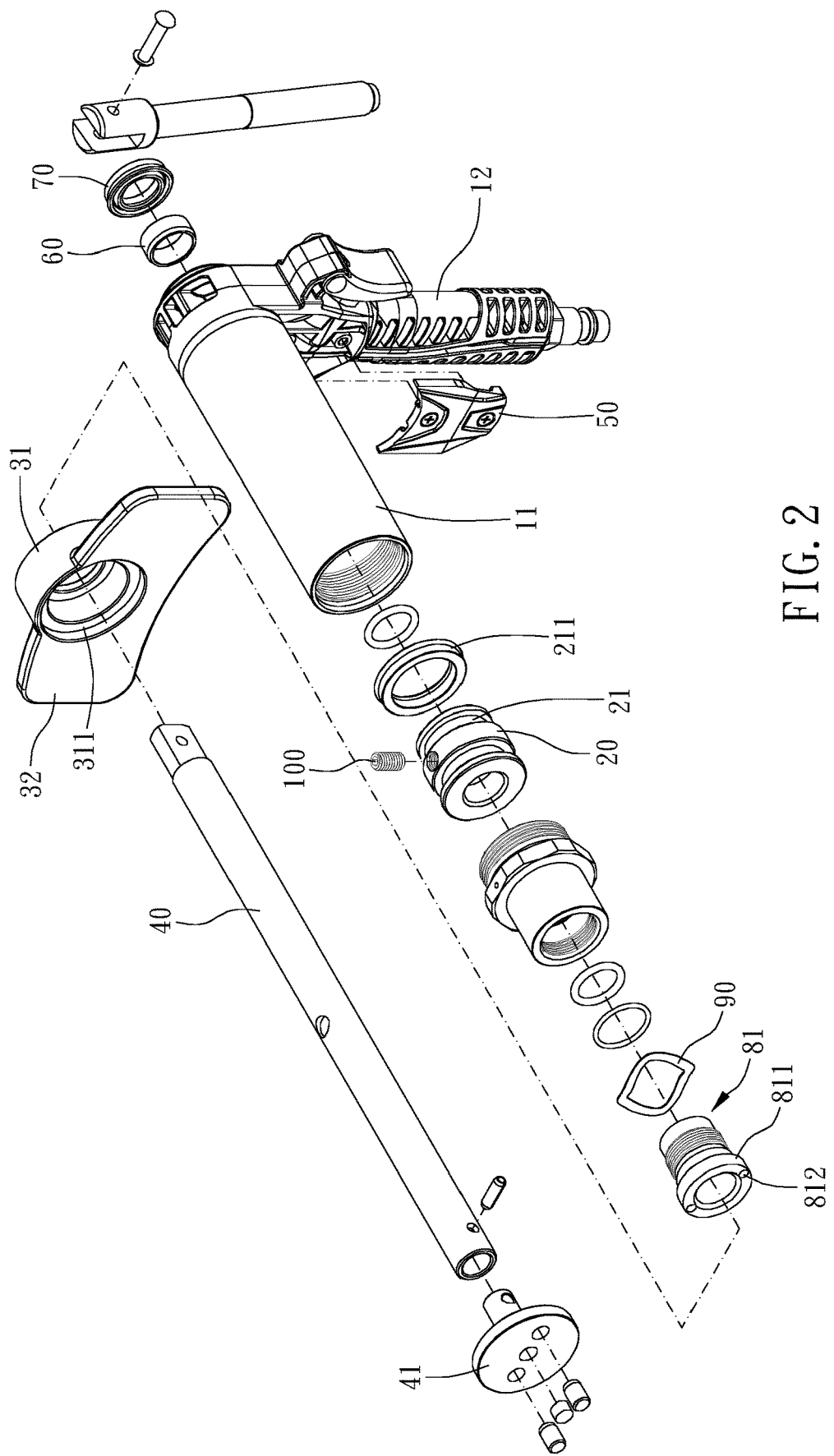
FIG. 2 is a breakdown drawing of a preferable embodiment of the present invention.
Figure 3:
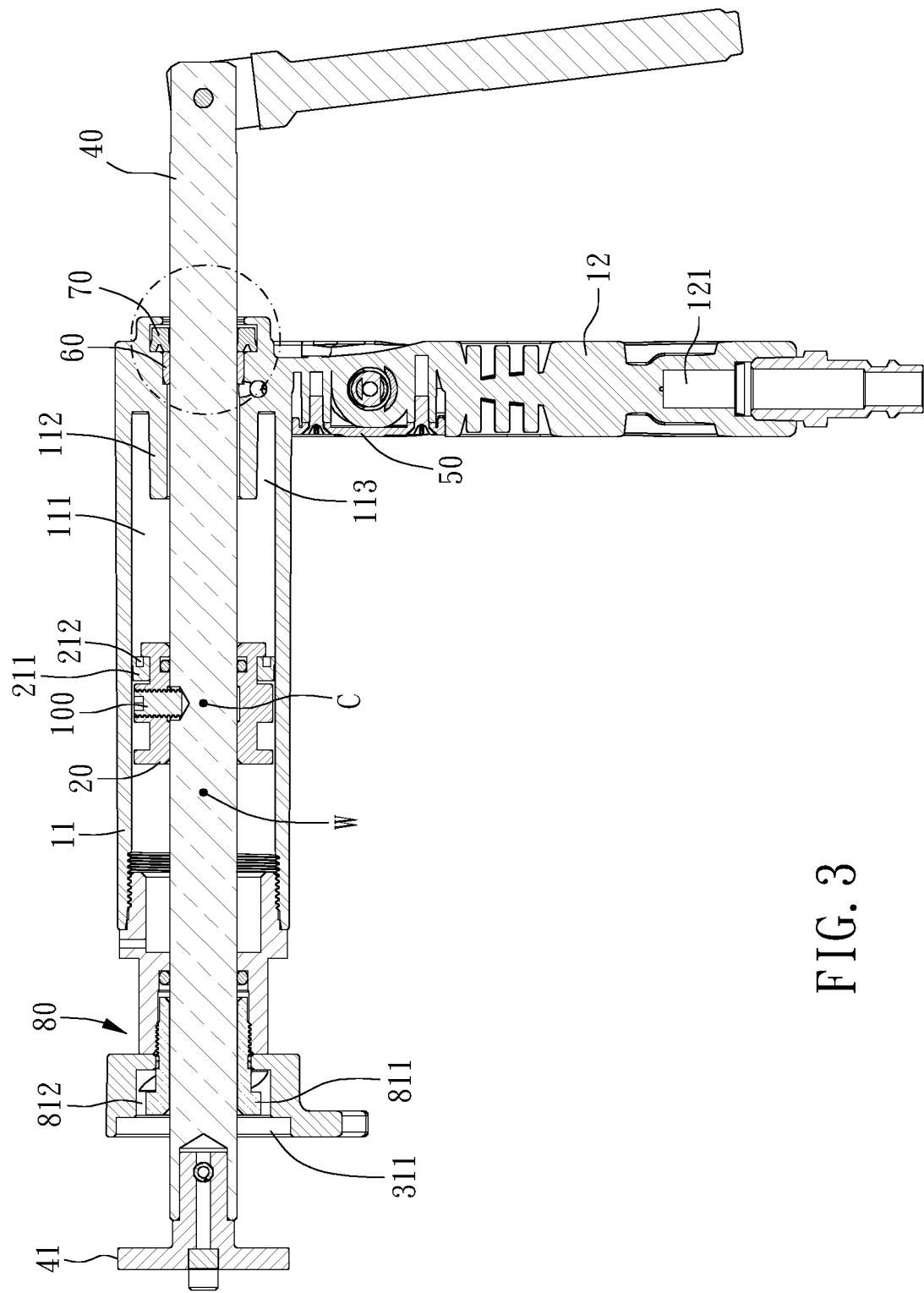
FIG. 3 is a cross-sectional view of a preferable embodiment of the present invention.
Figure 4:
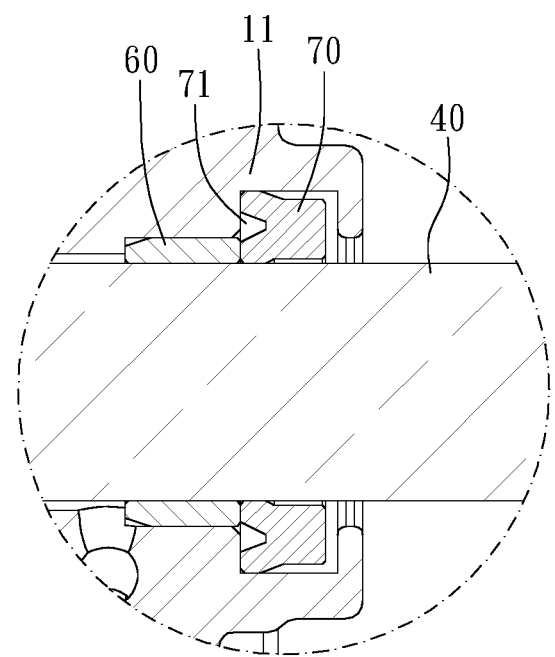
FIG. 4 is a partial enlargement of FIG. 3.

Please refer to FIGS. 1 to 4 for a preferable embodiment of the present invention. An adjustor 1 for a secondary pump of a brake of the present invention includes a main body 10, a piston 20, a blocking member 30 and a rod 40.

The main body 10 is integrally formed of one piece, the main body 10 includes a cylinder 11 and a handle 12 connected to the cylinder 11, the cylinder 11 has a chamber 111 thereinside, and the handle 12 has a passage 121 in communication with the chamber 111. The piston 20 is movably received in movably the chamber 111. The blocking member 30 is connected to the cylinder 11. The rod 40 is connected to the piston 20 and extends through the cylinder 11. Because the main body 10 is integrally formed of one piece, the adjustor 1 is provided with good sealing performance, simple structure, convenient and fast manufacturing and assembling, and lower manufacturing cost.

Preferably, the adjustor 1 further includes a reinforcement member 50, a bushing 60 engaged in the cylinder 11, and an O-ring 70 engaged in the cylinder 11. The reinforcement member 50 is assembled to the main body 10 and abutted against and between the cylinder 11 and the handle 1, and the reinforcement member 50 is preferably made of metal and detachable, wherein the reinforcement member 50 can enhance the structural strength of interconnection of the cylinder 11 and the handle 12. The bushing 60 is disposed around the rod 40, and the bushing 60 and the main body 10 are made of different materials. For example, the main body 10 is made of nylon (light weight), the bushing 60 is made of copper (with good sealing, low friction, and durability). The O-ring 70 is disposed around the rod 40 and abutted against the bushing 60, which improves sealing effect. In this embodiment, the O-ring 70 includes an annular groove 71 open in a direction toward the bushing 60, which provides good sealing.

In this embodiment, the blocking member 30 is connected to the cylinder 11 by a connection assembly 80. A tubular receiver 81 is disposed through the blocking member 30, connected (directly or indirectly) to the cylinder 11 and disposed around the rod 40. Preferably, the tubular receiver 81 is screwed to the cylinder 11, thus being easy to assemble/disassemble and/or replace; an elastic member 90 (such as a wave spring) is axially abutted against and between the tubular receiver 81 and the blocking member 30, so that the tubular receiver 81 and the cylinder 11 can be stably connected with each other and is not easy to loose.

In this embodiment, the piston 20 is made of aluminum, and the rod 40 is made of metal with sufficient strength, so that the piston 20, the weight distribution of the rod 40 the main body 10 and the blocking member 30 can be properly arranged; a weight ratio of the main body 10 and the connection assembly 80 ranges from 0.610 to 0.810, a weight ratio of the main body 10 and the piston 20 ranges from 0.325 to 0.525, a weight ratio of the main body 10 and the blocking member 30 ranges from 0.325 to 0.525, and a weight ratio of the main body 10 and the rod 40 ranges from 0.300 to 0.500. As such, the adjustor 1 has proper weight distribution and balanced center of gravity position, which can be operated stably.

Specifically, the cylinder 11 further includes a tubular portion 112 extending toward the piston 20 and disposed around the rod 40, so that the rod 40 can be well guided; the tubular portion 112 and the inner wall of the chamber 111 define an annular space 113 therebetween, which avoids affection of the operation by drag due to the negative pressure between the inner wall of the piston 20 and the chamber 111; a threaded member 100 is disposed radially through the piston 20 and inserted in the rod 40, thus reinforcing combination and being easy to assemble/disassemble and/or replace; the center of gravity W of the adjustor 1 is preferably located between a geometric center C of the piston 20 and the blocking member 30, which is advantageous to installation of the adjustor 1 on the secondary pump of the brake; the piston 20 includes at least one annular recess 21, at least one O-ring 211 is received in the at least one annular recess 21, the at least one O-ring 211 is annularly abutted against an inner wall of the chamber 111, and the at least one O-ring 211 includes an annular groove 212 open in a direction away from the blocking member 30, which improves the sealing effect.

Specifically, the blocking member 30 includes a barrel 31 disposed around the rod 40 and a board 32 connected to the barrel 31 and extending radially, the barrel 31 is offset relative to the board 32 and partially protrusive beyond the board 32, which lowers the center of gravity to be advantageous to installation of the adjustor 1 on the secondary pump of the brake. A push plate 41 is disposed on an end of the rod 40, the barrel 31 includes a stepped recess 311, and the push plate 41 is retractable within the stepped recess 311, which reduces the total length of the adjustor 1 and increases the movement stroke of the rod 40. The tubular receiver 81 includes an annular flange 811 received in the blocking member 30, the elastic member 90 is axially abutted against and between the annular flange 811 and the blocking member 30, and the annular flange 811 includes at least one through hole 812 disposed therethrough axially, which avoids affection of the operation by drag due to the negative pressure between the push plate 41 and the blocking member 30 between. Additionally, the adjustor 1 may further include a pressure relief valve or/and inlet valve selectively in communicating with the chamber 111, wherein the inlet valve is configured to be controlled to allow entrance of fluid into the chamber 111 or to block fluid from coming into the chamber 111, and wherein the pressure relief valve is configured to be controlled to allow discharge of high-pressure fluid from the chamber 111 so that the adjustor 1 can be repositioned.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An adjustor for a secondary pump of a brake, including:
   a main body, being integrally formed of one piece, including a cylinder and a handle connected to the cylinder, the cylinder having a chamber thereinside, the handle having a passage in communication with the chamber;
   a piston, movably received in the chamber;
   a blocking member, connected to the cylinder;
   a rod, connected to the piston and extending through the cylinder; and
   a reinforcement member, wherein the reinforcement member is assembled to the main body and abutted against and between the cylinder and the handle.

2. The adjustor of claim 1, further including a bushing engaged in the cylinder, wherein the bushing and the main body are made of different materials, and the bushing is disposed around the rod.

3. The adjustor of claim 2, further including an O-ring engaged in the cylinder, wherein the O-ring is disposed around the rod and abutted against the bushing.

4. An adjustor for a secondary pump of a brake, including:
   a main body, being integrally formed of one piece, including a cylinder and a handle connected to the cylinder, the cylinder having a chamber thereinside, the handle having a passage in communication with the chamber;
   a piston, movably received in the chamber;
   a blocking member, connected to the cylinder; and
   a rod, connected to the piston and extending through the cylinder;
   wherein the blocking member is connected to the cylinder by a connection assembly, a weight ratio of the main body and the connection assembly ranges from 0.610 to 0.810, a weight ratio of the main body and the piston ranges from 0.325 to 0.525, a weight ratio of the main body and the blocking member ranges from 0.325 to 0.525, and a weight ratio of the main body and the rod ranges from 0.300 to 0.500.

5. The adjustor of claim 4, wherein the reinforcement member is made of metal and detachable; the adjustor further includes a bushing engaged in the cylinder, the bushing is made of copper, the main body is made of nylon, the bushing is disposed around the rod, the piston is made of aluminum; the adjustor further includes an O-ring engaged in the cylinder, the O-ring is disposed around the rod and abutted against the bushing, and the O-ring includes an annular groove open in a direction toward the bushing; the piston includes at least one annular recess, at least one O-ring is received in the at least one annular recess, the at least one O-ring is annularly abutted against an inner wall of the chamber, and the at least one O-ring includes an annular groove open in a direction away from the blocking member; a tubular receiver is disposed through the blocking member, screwed to the cylinder and disposed around the rod, an elastic member is axially abutted against and between the tubular receiver and the blocking member, and the elastic member is a wave spring; the tubular receiver includes an annular flange received in the blocking member, the elastic member is axially abutted against and between the annular flange and the blocking member, and the annular flange includes at least one through hole disposed therethrough axially; the cylinder further includes a tubular portion extending toward the piston and disposed around the rod, and the tubular portion and the inner wall of the chamber define an annular space therebetween; a threaded member is disposed radially through the piston and inserted in the rod; a center of gravity of the adjustor is located between a geometric center of the piston and the blocking member.

6. An adjustor for a secondary pump of a brake, including:
   a main body, being integrally formed of one piece, including a cylinder and a handle connected to the cylinder, the cylinder having a chamber thereinside, the handle having a passage in communication with the chamber;
   a piston, movably received in the chamber;
   a blocking member, connected to the cylinder; and
   a rod, connected to the piston and extending through the cylinder;
   wherein a tubular receiver is disposed through the blocking member, connected to the cylinder and disposed around the rod, and an elastic member is axially abutted against and between the tubular receiver and the blocking member.

7. The adjustor of claim 6, wherein the tubular receiver includes an annular flange received in the blocking member, the elastic member is axially abutted against and between the annular flange and the blocking member, and the annular flange includes at least one through hole disposed therethrough axially.

8. An adjustor for a secondary pump of a brake, including:
a main body, being integrally formed of one piece, including a cylinder and a handle connected to the cylinder, the cylinder having a chamber thereinside, the handle having a passage in communication with the chamber;
a piston, movably received in the chamber;
a blocking member, connected to the cylinder; and
a rod, connected to the piston and extending through the cylinder;
wherein the blocking member includes a barrel disposed around the rod and a board connected to the barrel and extending radially, and the barrel is offset relative to the board and partially protrusive beyond the board;
wherein a push plate is disposed on an end of the rod, the barrel includes a stepped recess, and the push plate is retractable within the stepped recess.

* * * * *